July 29, 1969  N. R. ADLER ET AL  3,457,831
PLUNGE ACTUATED CUTTER FOR KEYS HAVING ANGULARLY DIRECTED BITS
Filed Aug. 24, 1967  2 Sheets-Sheet 1
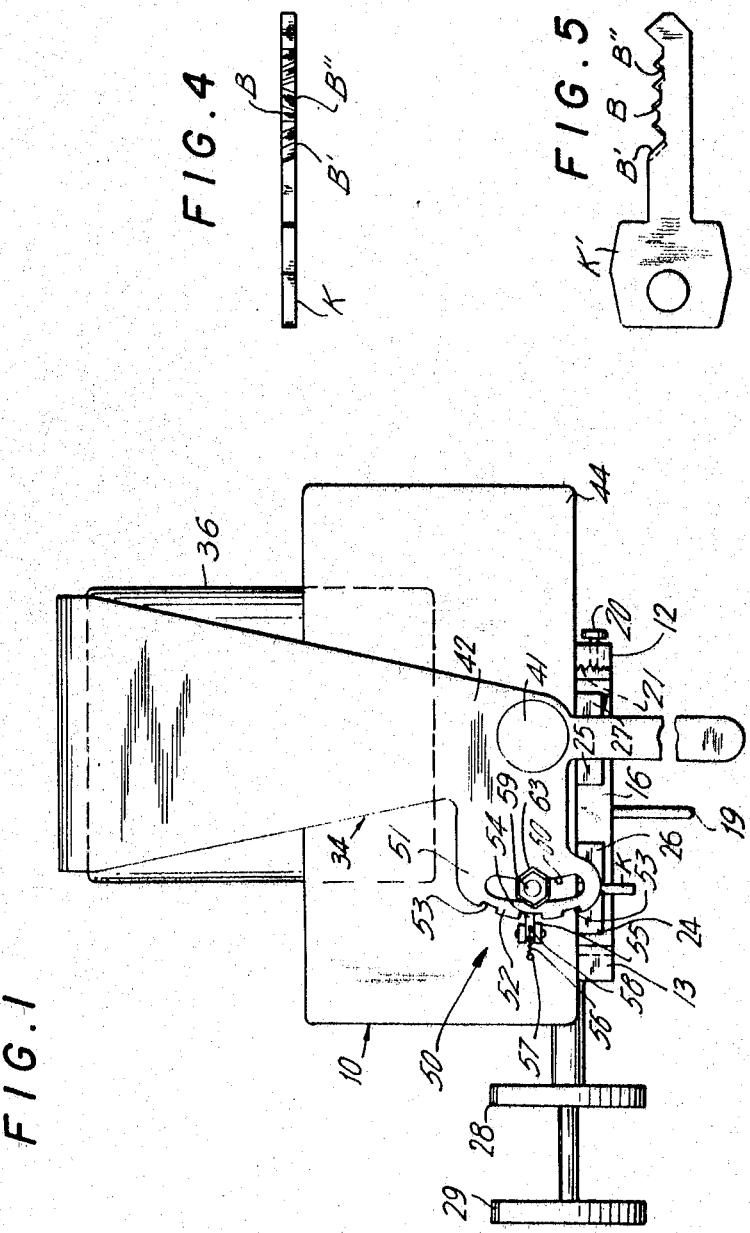
INVENTORS
NORMAN R. ADLER
RAPHAEL W. GODIN
HENRY J. LE BLANC
BY Mark Basreches
ATTORNEY July 29, 1969  N. R. ADLER ET AL  3,457,831
PLUNGE ACTUATED CUTTER FOR KEYS HAVING ANGULARLY DIRECTED BITS
Filed Aug. 24, 1967  2 Sheets-Sheet 2
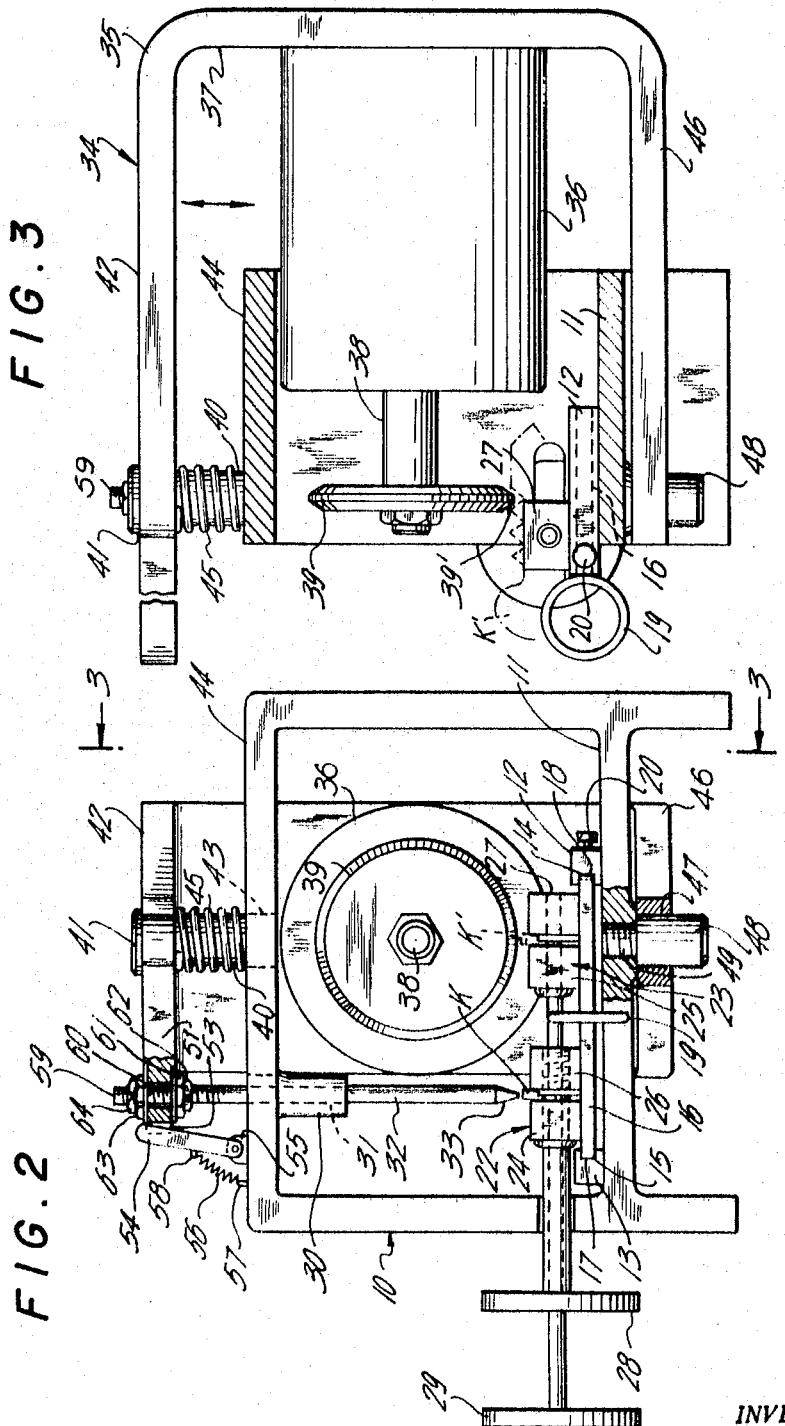
INVENTORS
NORMAN R. ADLER
RAPHAEL W. GODIN
HENRY J. LE BLANC
BY Mark Wasseches
ATTORNEY United States Patent Office 3,457,831
Patented July 29, 1969

3,457,831
PLUNGE ACTUATED CUTTER FOR KEYS HAVING ANGULARLY DIRECTED BITS
Norman R. Adler, Fitchburg, Raphael W. Godin, Leominster, and Henry J. Le Blanc, Fitchburg, Mass., assignors to Ilco Corporation, Fitchburg, Mass., a corporation of Massachusetts
Filed Aug. 24, 1967, Ser. No. 663,024
Int. Cl. B23c 1/16, 1/18
U.S. Cl. 90—13.05
6 Claims

ABSTRACT OF THE DISCLOSURE

A key cutter for duplicating keys through the use of a pattern key, wherein the bits of the pattern key are angularly directed with respect to the plane of the key, including a carriage carrying a stylus and a cutter, the carriage being pivotally and axially movable with respect to a base carrying key and key blank vises spaced in accordance with the spacing of the stylus and cutter.

CROSS REFERENCES

Key Cutter Device, specification Ser. No. 663,083.
Key Cutter Device, specification Ser. No. 663,094.

BACKGROUND OF THE INVENTION

Field of the invention

This invention is in the field of key duplication, and more particularly in the field of duplicating keys of the type in which the key to be duplicated includes bits formed at an angle with respect to the plane described by the key.

The prior art

Various key cutting machines are known. In accordance with one known principle, a pattern key to be simulated and a key blank are clamped in predetermined related positions with respect to the carriage carrying a cutter and a stylus or depth guage disposed in comparable, predetermined relationship. The stylus is moved over the pattern key, shifting the carriage in a predetermined path and, since the cutter is also mounted on the carriage, the cutter is caused to duplicate the configuration followed by the stylus in a key blank. While numerous machines operating on such principle have been successfully employed, it has never been possible heretofore to utilize such machines to duplicate keys wherein some or all of the bits are displaced at an angle with respect to a plane passing through the axis of the key.

Certain types of locks heretofore known operate on principles which require the bitting of the key to be displaced at an angle with respect to the plane described by the key blank. Heretofore it has been necessary either to hand file such keys, if field duplication is desired, or to produce the same in the factory by the use of specialized manufacturing equipment. Efficient field duplication has been essentially impossible and the difficulty of obtaining replacement keys without recourse to the factory has, in large measure, circumscribed the market for lock mechanisms requiring such keys.

Summary of the invention

A key cutting machine for cutting keys, and particularly keys having one or more bits disposed at an angle or angles to the plane of the key blank, from a pattern key or simulation, comprising a base, a carriage pivotally mounted to the base and movable, in addition, toward and away from the base, a stylus and a cutter depending from the carriage, the cutter being pivoted when the carriage is pivoted about the pivot axis, the stylus remaining stationary upon such pivotal movement, the stylus being moved toward and away from the base when the carriage is moved toward and away from the base, the base including key and key blank vises disposed in registry, respectively, with the stylus and cutter, whereby in the movement of the carriage toward the base, the stylus acts as a depth gauge by engaging the bit formed in a cut key, causing the cutter to form in the key blank a cut of equal depth to that sensed by the stylus in the pattern key.

It is accordingly an object of the invention to provide a key cutter of the pattern key type for forming a key blank having cuts angularly directed with respect to the axis of the key.

A further object of the invention is the provision of an improved key cutter of the type described wherein individual cuts which may be at a plurality of different angles are sequentially formed in a key blank, the depth of the cuts formed in the blank being governed by the depth of the cuts formed in the pattern key.

To attain these objects and such further objects as may appear herein or be hereinafter pointed out, reference is made to the accompanying drawings, forming a part hereof, in which:

FIGURE 1 is a plan view of a key cutter in accordance with the invention;

FIGURE 2 is a front elevational view of the device of FIGURE 1;

FIGURE 3 is a side elevational view of the cutter of FIGURES 1 and 2;

FIGURES 4 and 5 are plan and side elevational views, respectively, of one form of cut key incorporating bits formed at angles with respect to the longitudinal axis of the key.

In accordance with the invention, 10 is a frame which may be mounted to a work surface or the like. The frame includes a base portion 11 carrying spaced parallel side guides 12, 13. The guides 12, 13 are recessed, as at 14, 15, respectively, to carry vise support plate 16 for linear shifting movement, the side edges 17, 18 of the plate being disposed in the slots 15, 14, respectively.

A vise adjustment pull 19 is fixed to the vise plate 16 to facilitate inward and outward movement of the vise within the guideways 12, 13. A detent plunger 20 is spring pressed inwardly from the guideway 12, selectively to engage one of the notches or serrations 21 formed in the laterally directed edge 18 of the slide plate—see FIGURE 1. It will thus be seen that the inward or outward adjusted position of the slide plate may be set at certain predetermined increments by the coaction of the inner end of the plunger 20 with the serrations 21.

The vise plate 16 carries laterally spaced clamps or vises 22, 23 incorporating fixed jaws 24, 25 and movable jaws 26, 27. It will be understood that jaw 26 may be moved toward and away from jaw 24 by tightening knob 28 and, similarly, that the jaw 27 may be moved toward the jaw 25 by the knob 29, to effect clamping of a key and key blank respectively disposed between the fixed and movable jaws of the vises.

The frame 10 carries a depending boss 30 which is provided with a vertically directed aperture 31, stylus 32 being sleeved through said aperture. The stylus 32 may be shifted vertically within the aperture 31. The lowermost end 33 of the stylus defines a depth gauge tip.

To the frame 10 is mounted a motor carriage assembly 34, including a generally U-shaped yoke 35. A key cutting motor 36 is bolted to the rear arm 37 of the yoke, the motor shaft 38 carrying the usual profiled cutter wheel 39.

The carriage assembly 34 is mounted to the frame 10 by a connection providing both a pivotal and an upward and downward range of movement of the carriage with respect to the frame. For this purpose, a stub shaft 40, shouldered as at 41, is secured to the upper arm 42 of the yoke 35, the shaft being press fit within an aperture formed in said upper arm. The shaft 40 passes through vertically directed bearing aperture 43 formed through horizontally directed crosspiece 44 of the frame 10. A compression spring 45 is interposed between the arm 42 of the yoke and the crosspiece 44, serving normally to bias the parts 42, 44 away from each other.

The lower arm 46 of the yoke 35 is formed with a vertically directed bearing aperture 47 in coaxial alignment with the aperture 43 in the crosspiece 44. A guide shaft 48 extends through the aperture 47, the upper end 49 of the guide shaft being threaded into the base 11 of the frame 10.

From the foregoing it will be seen that the carriage 34 is pivotally mounted to the frame by the sliding engagement of shafts 40 and 48 in apertures 43, 47, respectively, and that the aforesaid pivotal connection nonetheless permits an upward and downward vertical shifting movement of the carriage with respect to the base when a downward force is applied to the upper arm 42 of the yoke.

The pivot axis defined by the pivot members 41, 48 intersects the axis of rotation of the motor shaft 38 and coincides with the lowest point 39' of the cutter wheel 39.

Blocking detent means 50—see FIGURES 1 and 2— are provided for locking the carriage 34 in one of a series of predetermined angular positions with respect to the frame 10. For this purpose, the carriage incudes a laterally directed extension arm 51, terminating in an arcuate end portion 52, the end portion 52 being provided with three angularly spaced-apart notches 53. As best seen in FIGURE 1, the notches include perpendicular side wall portions. A spring pressed detent lever 54 is pivoted between spaced legs 55 fixed to the crosspiece 44 of the frame. A compression spring 56 is biased between spring seat 57 on the frame and spaced seat 58 on the lever 54.

It will thus be seen that the detent lever 54 is biased into one of the notches 53 when the notch is aligned with the lever, and in the noted biased position will maintain the carriage 34 at a selected angle with respect to the frame during up and down movement of the carriage, the angle being determined by the notch employed.

As previously mentioned, the stylus 32 is fixed to the crosspiece 44 and cannot move angularly with respect thereto, although it is free to move upwardly and downwardly within the bore 31 formed in the boss 30.

The upper end 59 of the stylus is threaded, the threaded portion being slidably secured within arcuate slot 60— see FIGURE 1—formed in the extension arm 51 of the carriage 34. Since the height of the tip 33 of the stylus will determine the depth of cut effected by the cutter wheel 39, adjustment means, comprising an adjustment nut 61 and a lock nut 62 are threaded onto the portion 59 of the stylus lying directly beneath the extension arm 51 to effect initial setting of such height. Adjustment is effected by rotating the upper nut 61 when the carriage 34 is depressed until the upper surface of the nut 61 bears against the under surface of the extension arm 51, when the lowermost end 33 of the stylus is in coplanar vertical alignment with the lowermost portion 39' of the cutter wheel. When this adjustment is effected, lock nut 62 is tightened against the upper nut 61 to secure the parts in the desired position.

It will be observed that the adjustment previously discussed must be periodically checked, to assure that after protracted cutting the heightwise orientation of the stylus is coordinated with the low point 39' of the cutter wheel.

A lift nut 63 and locking nut 64 are threaded onto the portion 59 of the stylus at a position above the extension arm 51, to lift the stylus on the return or upward stroke of the carriage. It will be observed that the adjusted position of the upper nut 63 and upper lock nut 64 is not critical, it being merely necessary to assure that neither of the sets of locking nuts binds against the portions of the extension arm 51 defining the arcuate slot 60.

By this means it will be observed that a lost motion connection is defined between the carriage and the stylus, permitting pivotal movement of the carriage relative to the stylus, to assure that the stylus will move downwardly and upwardly when the carriage is shifted downwardly and upwardly.

OPERATION

In order to operate the cutter device, a pattern key K is clamped in vise 22 by means of the tightener knob 28. In similar manner, key blank K' is clamped in the vise 23 by tightening the knob 29. The key and blank may be accurately positioned in the vises in the usual manner, by urging the key shoulder portions against the leading edge of the vises.

By the use of vise adjustment pull 19, the slide plate 16 carrying the vises is adjusted in position for forming the initial cut. It will be observed that it is not material whether the first formed cut is nearest or furthest from the shoulder of the key.

The slide 16 is retracted until the detent plunger 20 lies within the proper detent, whereupon the first bit of the pattern key is aligned beneath the lowermost tip 33 of the stylus. At this juncture, the operator determines whether the aligned bit portion is perpendicular or angled to the key blade. In any instance, the carriage would be tilted to engage the detent lever 54 in appropriate notch 53 so that the profiled cutter wheel 39 is parallel to the bit to be formed.

Since the stylus does not move during the pivot movement of the carriage, the tip 33 of the stylus will at all times remain directly above the appropriate bit. In some instances it may be desirable to space the upper nuts 63, 64 of the stylus a considerable distance from the lower nuts so that the stylus may be disposed only a small distance above the level of the pattern key K even in the upwardmost position of the carriage 34, thereby facilitating identification to the operator of the bit which is to be cut.

When the angle of the carriage is properly set, the cut is formed by pressing downwardly on the upper arm 42 of the carriage, causing the carriage to be shifted downwardly against the upward biasing pressure of spring 45. The bit or cut is formed in the key blank K', the depth of the cut being limited by the engagement of the stylus tip 33 against the appropriate bit portion of the pattern key.

Since the lower end 33 of the stylus is generally frustoconic in vertical section, the taper of the conic portion matching the angle of the bit and also matching the trapezoidal slot formed by the profiled cutter 39, it will be observed that a correct depth measurement will at all times be effected, notwithstanding the pattern key is disposed at an angle with respect to the lower end of the stylus.

After formation of the first cut, the slide is advanced one notch by withdrawing the plunger 20, shifting the slide and permitting the plunger to return into the next serration or seat 21. The angle of the carriage with respect to the vises is thereupon re-adjusted in accordance with the angle of the bit now lying beneath the stylus tip 33, by operation of the lever 54 in the manner previously noted.

Succeeding cuts are formed by repeating the steps previously set forth.

After formation of all of the bits, key K and the now cut key blank K' are removed from the vises and preferably the blank K' is deburred, as with a wire brush or the like.

From the foregoing it will be observed that there is provided a key cutter device which is capable of accurately reproducing in a key blank, bits formed on a pattern key, which bits may be angularly related to the plane of the body portion of the key.

In FIGURES 4 and 5 there are shown plan and side elevational views of a cut key including perpendicular bits or cuts B, left hand cut bits B' and right hand cut bits B,"

The device is simple to operate, and is essentially foolproof and permits the formation in a locksmithing establishment of keys which were formerly available only from the factory.

While the device is illustrated in conection with a pair of vises which are axially shiftable with respect to a stationary cutter and stylus carriage, it will be readily recognized that the device may be altered without departing from the spirit of the present invention if the vises remain stationary and means are provided for shifting the cutter and carriage longitudinally with respect to the axis of the key and blank.

While the key and blank are illustrated as fixed with respect to pivotal movement and the carriage is indicated to be pivoted to provide the necessary pivotal movement for formation of the angular cuts, it is within the scope of the present invention to effect the necessary pivoting movement by mounting the vises on a rotatable table and pivoting the table to the desired degree.

Having thus described the invention and illustrated its use, what is claimed as new and is desired to be secured by Letters Patent is:

1. A key cutter for cutting a key having bits disposed at a variety of angles with respect to the plane of the key blade, comprising a base portion, first and second laterally spaced-apart vise means mounted on said base portion for holding a key and a key blank in parallel spaced position, a carriage pivotally mounted to said base for pivotal movement about an axis parallel to said key and key blank, said carriage being shiftable in the direction of said pivot axis toward and away from said base, cutter means depending from said carriage in registry with said first vise, stylus means mounted on said carriage in registry with said second vise for movement toward and away from said base in accordance with the toward and away movement of said carriage, clearance connection means interposed between said carriage and stylus means for permitting pivotal movement of said carriage about said axis without concomitant movement of said stylus means, spring means urging said carriage away from said base for normally disposing said cutter means and stylus means in spaced relation to said first and second vises, respectively, said carriage being shiftable toward said base a distance limited by the engagement of said stylus means and a key mounted in said second vise means.

2. A device in accordance with claim 1 wherein said pivot axis coincides with the plane of a key in said first vise means and with the closest point of approach of said cutter means to said first vise means.

3. A device in accordance with claim 2 wherein said first and second vise means are mounted for movement along said base in the direction of said pivot axis.

4. A device in accordance with claim 3 wherein said cutter means and stylus means depend equal distances beneath said carriage.

5. A key cutter device comprising a base, a carriage pivotally mounted to said base for movement toward and away from said base in a path parallel with the pivot axis of said pivotal connection, key cutter means depending from said carriage, stylus means spaced from said key cutter means and depending from said carriage a distance equal to the depending distance of said key cutter means, clearance connection means interposed between said carriage and stylus for permitting pivotal movement of said carriage relative to said stylus, first and second clamp means mounted to said base in registry with said cutter means and stylus means, respectively, and spring means interposed between said carriage and base for yieldably biasing said carriage away from said base, the plane of a key carried in said first vise means coinciding with said pivot axis.

6. A device in accordance with claim 5, including detent means interposed between said carriage and base for permitting said carriage and base to be set in a plurality of predetermined pivoted relations one to the other.

References Cited
UNITED STATES PATENTS

| | | | |
|---|---|---|---|
| 749,598 | 1/1904 | West | 90—13.05 |
| 1,750,218 | 3/1930 | Falk | 90—13.05 |
| 1,752,668 | 4/1930 | Johnson | 90—13.05 |
| 1,803,428 | 5/1931 | Falk | 90—13.05 |
| 1,811,922 | 6/1931 | Falk | 90—13.05 |

GERALD A. DOST, Primary Examiner